Feb. 20, 1945.   P. W. THORNHILL ET AL   2,369,926
BALL AND ROLLER BEARINGS, PARTICULARLY THOSE FOR RECTILINEAR MOTION
Filed Nov. 23, 1943   2 Sheets-Sheet 1
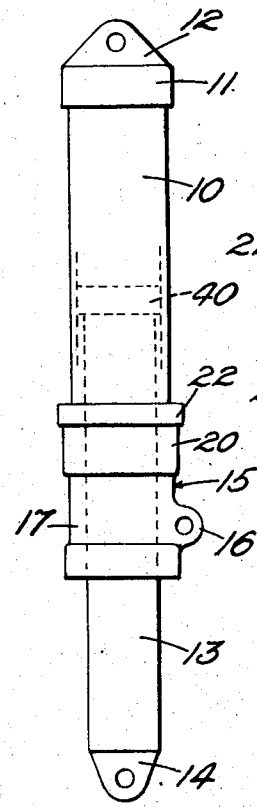
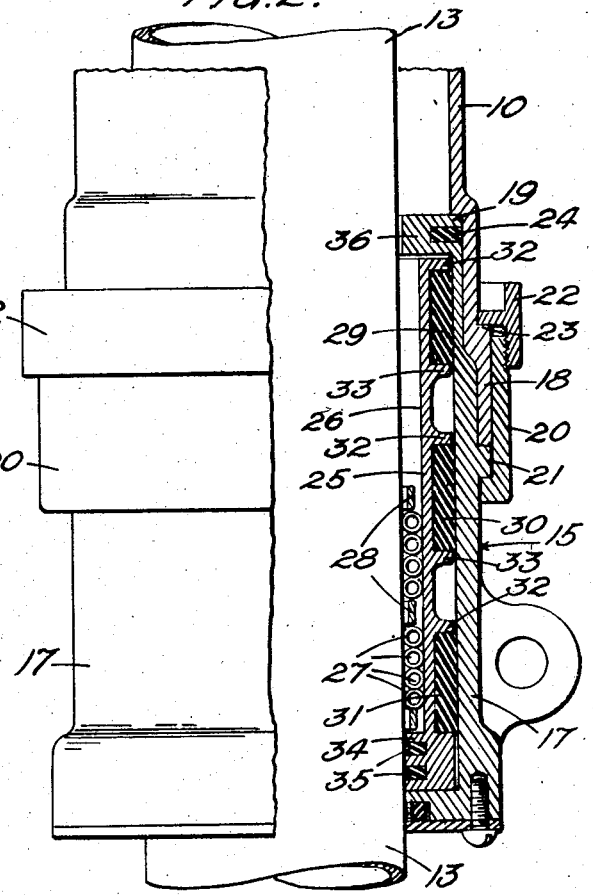

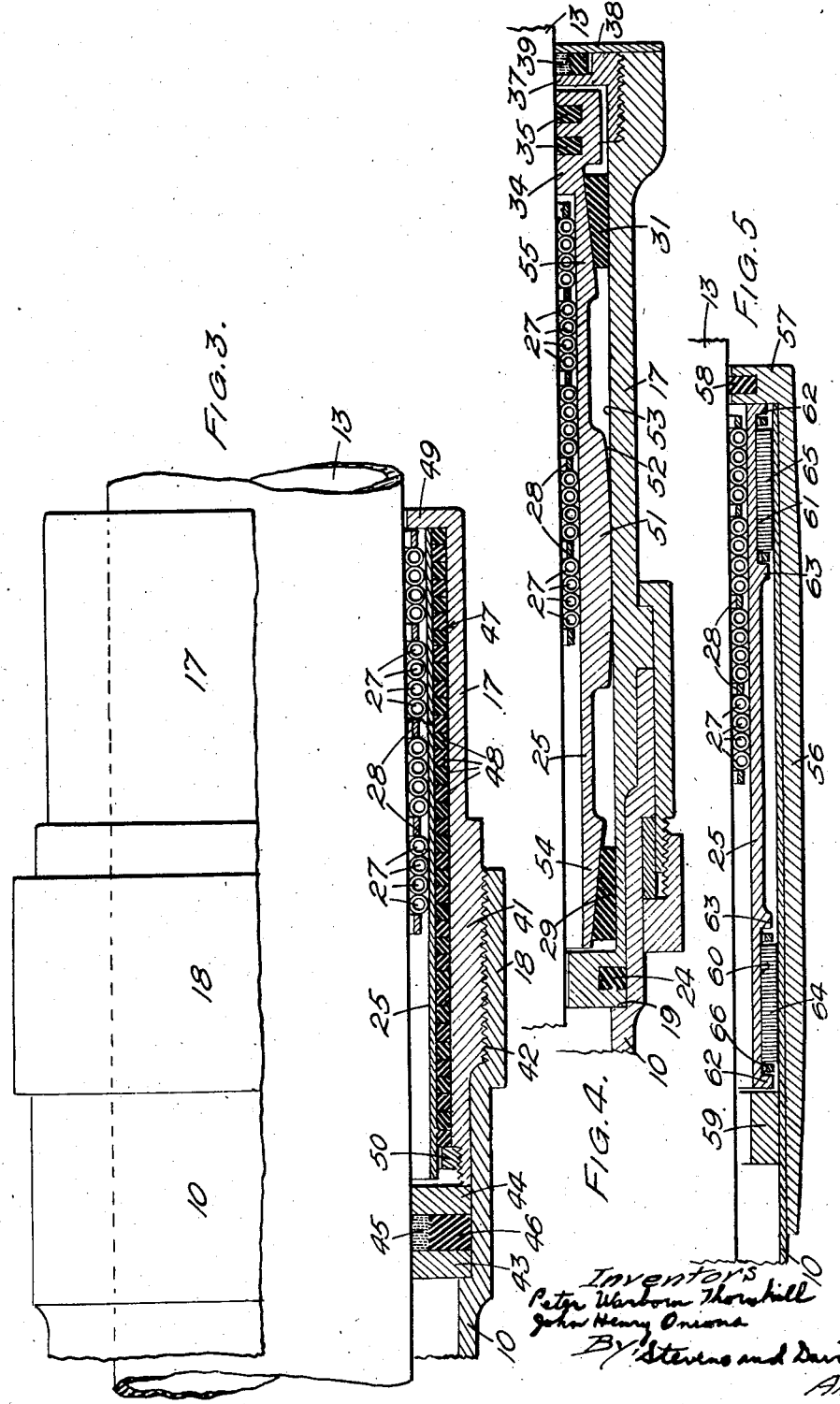

Patented Feb. 20, 1945

2,369,926

UNITED STATES PATENT OFFICE 2,369,926

BALL AND ROLLER BEARINGS, PARTICULARLY THOSE FOR RECTILINEAR MOTION

Peter Warborn Thornhill, Leamington Spa, and John Henry Onions, Coventry, England; said Thornhill assignor to said Onions Application November 23, 1943, Serial No. 511,430
In Great Britain December 2, 1942

11 Claims. (Cl. 308—6)

This invention relates to bearings of the kind (hereinafter mentioned as the kind referred to) comprising an outer tubular member and an inner member arranged within said outer member, and balls or rollers which are interposed between the adjacent surfaces of said members to reduce friction as the inner member moves telescopically relative to the outer member.

When bearings of this kind are used in conjunction with telescopic members which have to resist a bending moment, difficulty is sometimes experienced due to the tendency of one member to cant relative to the other, thereby putting a localised increased stress upon the end balls or rollers and consequently producing a tendency for the balls or rollers to be overstrained and/or the co-operating surfaces of the members to become indented, especially where the parts are subject to vibration, as in the telescopic struts of aircraft undercarriages, and shock absorbers for vehicles.

It is the object of the present invention to provide an improved form and construction of bearing in which this difficulty is avoided or at least reduced.

In a bearing of the kind above referred to, according to the invention an auxiliary race member is mounted resiliently upon one of the members to provide a longitudinal running surface for the balls or rollers, the resilient mounting permitting the auxiliary race member to cant relatively to the said one member when a bending moment is transmitted from one of the telescopic members through the balls or rollers to the other of said members.

There is further provided according to the invention a bearing of the kind referred to, wherein an auxiliary race member of tubular form, having a longitudinally extending running surface for the balls or rollers, is fitted into or around one of the telescopic members, resilient means supporting said auxiliary race member being arranged to allow the latter to cant relative to the telescopic member to which it is fitted.

The resilient means by which the auxiliary race member is mounted can comprise an annular sleeve composed of rubber or like soft elastic material. Alternatively the resilient means may comprise a plurality of rings of rubber or like soft elastic material. A stop device is conveniently provided, separately from the auxiliary race member, to limit the lateral relative movement of the telescopic members and thereby limit the compressive load which is applied to the balls or rollers by such relative movement.

The improved form of bearing is particularly suitable for installation between a cylinder and a plunger mounted for telescopic movement therein, the auxiliary race member conveniently being fitted to the cylinder so that the balls or rollers roll directly against the surface of the plunger.

In another construction according to the invention the resilient means comprises a plurality of rollers which are resilient radially and are interposed between the auxiliary race member and the cylinder to permit the auxiliary race member to rotate within the cylinder.

The invention is illustrated by way of example in the accompanying diagrammatic drawings, in which:

Figure 1 is a side elevation of a telescopic shock absorber incorporating the improved form of bearing;

Figure 2 is a fragmentary sectional elevation of Figure 1 drawn to an enlarged scale and showing the bearing;

Figure 3 is a fragmentary sectional view of a modified form of bearing; and

Figures 4 and 5 are similar views of two other modifications.

The shock absorber shown in Figure 1 comprises a cylinder tube 10, which is closed at its upper end by a cap 11 having a fastening lug 12. A plunger 13 is slidable telescopically within the cylinder 10 and is also provided with a fixing lug indicated at 14. A bearing assembly 15 secured to the lower end of the cylinder 10 is arranged in accordance with the invention, and is primarily intended to reduce friction due to side forces (such as bending moments) acting when the plunger 13 is required to reciprocate telescopically within the cylinder 10. The bearing assembly 15 is provided with a second attachment lug 16 for the cylinder 10, thus facilitating the rigid attachment of the cylinder 10, say to an aircraft.

The internal construction of the bearing assembly 15 is shown more clearly in Figure 2. It comprises a somewhat tubular outer casing 17, which fits within the adjacent flared end 18 of the cylinder 10 and is held firmly in position against a shoulder 19 by means of a collar 20 which bears against a flange 21 upon the outer casing 17. The collar 20 is tightened by means of a nut 22 bearing against a shoulder 23 upon the outside of the cylinder 10. A packing ring 24 is provided between the upper end of the casing 17 and the interior of the cylinder to prevent leakage of working fluid between these parts.

An auxiliary race member 25 of tubular form is mounted within the casing 17 so that its internal surface 26 acts as a longitudinal track for a number of flexible metal rollers, which are indicated at 27 and are arranged in groups within slots formed in a cage member 28. The rollers 27 also run upon the external surface of the plunger 13 and thus produce a substantially friction-free bearing for said plunger, the cage 28 travelling up and down, together with the rollers 27, along the length of the auxiliary race member 25 as the plunger 13 reciprocates within the cylinder 10. The auxiliary race member 25 is supported resiliently within the casing 17 by a plurality of short sleeves or rings 29, 30 and 31 composed of soft elastic material such as rubber, said rings being located between pairs of flanges 32, 33 formed upon the exterior of the race member 25. The latter is provided at its lower end with an inward shoulder 34 serving as a stop for the cage 28, said shoulder being provided with a pair of packing rings 35 forming a fluid-tight seal between the race member and the plunger. Axial movement of the race member 25 relative to the casing 17 is prevented in an upward direction by an inward flange 36 at the top of the casing 17, and in a downward direction by a collar 37, Figure 4, which is fitted within a recess in the enlarged lower end of the casing 17 and is held in position by an annular plate 38. A groove between the parts 37 and 38 accommodates a wiper ring 39.

When a shock absorber of this form is in service it often has to resist severe bending moments due to forces acting sideways upon the plunger 13. As the upper end of the plunger 13 is located, by the usual piston head 40 (see Figure 1), against lateral movement relative to the cylinder 10, the rollers 27 become subjected to very heavy compressive stresses, which are often accompanied by vibration of the parts. The auxiliary race member 25, however, mounted by means of the resilient rings 29, 30 and 31, effectively cushions the shocks experienced by the rollers, and in consequence has the desired result of minimising damage to the rollers and the running surfaces engaged thereby. If desired the clearance between the interior of the collar 37 and the plunger 13 may be regulated to limit the permissible sideways movement of said plunger relative to the casing 17 and consequently restrict the magnitude of the compressive force to which the rollers can be subjected.

In the modification shown in Figure 3 the casing 17 is formed with an externally screw-threaded thickened portion 41 arranged to fit within an enlarged mouth 18 of the cylinder 10 and to be screwed down firmly against a rounded shoulder 42. The inner end of the casing 17 butts against a packing device comprising a pair of metal washers 43 and 44 having between them a composite packing ring composed of an inner portion 45 of laminated canvas and an outer portion 46 in the form of a soft rubber or like ring; the laminated canvas portion 45 is thus pressed firmly against the plunger 13 to form a fluid-tight yet relatively flexible seal.

An auxiliary race member 25 is fitted resiliently within the casing 17 by means of a sleeve of resilient material such as soft rubber, said sleeve being indicated generally at 47 and being composed of a number of rings 48, each of substantially square cross-section. These rings are held in position at one end by a flange 49 upon the casing 17 and at the other end by a ring 50 screw-threaded into the end of the casing 17. As in the previous example, the plunger 13 is mounted within the auxiliary race member 25 by means of numerous spring roller bearings 27 which are located by a slotted cylindrical cage 28. The resilient sleeve 47 acts to cushion the auxiliary race member 25 and so avoid damage to its running surface and to the rollers 27 when the bearing is subjected to heavy side loads an/or to vibration. The flange 49 can be arranged to limit radial movement of the plunger 13 to prevent an excessive load from being applied to the rollers.

In the construction shown in Figure 4 the casing 17 and attachment to the cylinder 10 are substantially the same as in Figure 2. However, the auxiliary race member 25 is thickened substantially halfway along its length, as indicated at 51, thus providing a somewhat barrel-shaped convex surface 52 which is in rolling contact with the interior surface 53 of the casing 17. The end portions of the race member 25, which are conveniently thickened as indicated at 54 and 55, are supported resiliently within the casing 17 by a pair of rubber or like rings 29 and 31. These are in a state of radial compression and normally hold the race member 25 in a truly coaxial position. However, when the shock absorber as a whole is subjected to a bending moment the resilient rings 29 and 31 permit the auxiliary race member 25 to cant slightly with the plunger 13 relative to the cylinder axis and consequently avoid the imposition of excessive radial loads on the rollers 27, especially those rollers adjacent the ends of the cage 28.

Figure 5 shows diagrammatically a bearing arrangement which is suitable for cases where the plunger of a shock absorber is required to rotate about its axis, as well as to reciprocate telescopically relative to a cylinder. The cylinder and plunger are again indicated at 10 and 13 respectively. The end portion of the cylinder is reinforced by a cap 56 having an inwardly directed flange 57 fitted with a packing washer 58 co-operating with the surface of the plunger 13. A stop ring 59 is fitted within the cylinder 10, said ring and the flange 57 serving between them to prevent axial displacement of the auxiliary race member 25. This is again tubular in form and its interior surface serves as a track for the flexible rollers 27. In this case, however, the auxiliary race member 25 is arranged to be freely rotatable within the cylinder 10, and for this purpose it is formed upon the exterior of each of its end parts with a circumferential track 60 or 61 between abutment flanges 62 and 63. Fitted between the tracks 60 and 61 and the adjacent parts of the interior of the cylinder 10 are two series of rollers, indicated at 64 and 65. These rollers extend parallel with the axis of the plunger 13 and are supported in slots formed in cage members 66. In order that the auxiliary race member 25 may be resiliently mounted in relation to the cylinder 10 the rollers 64 and 65 are not solid, but are constituted by helices of steel wire, these being closely wound and being ground upon the outside so that each has a substantially smooth cylindrical external surface. Although the rollers 64 and 65 normally retain their circular cross-section when subjected to the radial loads which ordinarily occur in service, said rollers are sufficiently springy to compress diametrally and thus allow the auxiliary race member 25 to cant relative to the cylinder 10 in the event of an excessive bending moment being applied to the shock absorber. As explained above, this largely avoids the danger of damage to the rollers 27 and to the surfaces between which they operate.

It will be understood that the arrangements which have been described are given by way of example only and that various modifications may be made to suit requirements. For instance, the auxiliary race member may in some cases be fitted resiliently to the plunger; the longitudinally movable rollers or equivalent being disposed between the outside of this race member and the internal surface of a corresponding race member formed upon or fitted to the cylinder. Moreover, instead of using rollers for co-operation with the auxiliary race member, balls may be used, while it is possible to employ solid rollers of substantially barrel shape instead of the flexible spring variety; these solid rollers would, of course, co-operate with a plunger which, in cross-section, is scalloped.

The invention is of particular utility in conjunction with aircraft oleo legs and oleo-pneumatic suspension devices for vehicles, as the balls or rollers are normally subjected to considerable vibration and this greatly aggravates the trouble caused by the local overloading of the balls or rollers due to applied bending moment. It is, however, applicable to all cases in which a pair of telescopically slidable members are required to operate with very little friction, the bearing at the same time being subject to substantial bending moments or like radial thrusts.

What we claim is:

1. A bearing of the kind referred to comprising two members one of which is telescopic within the other, a plurality of axially spaced circumferential rows of anti-friction bearings between said members, an auxiliary race member between said anti-friction bearings and one of said members to provide a longitudinal running surface for said anti-friction bearings, and resilient means between said race member and the said one member to permit said race member to cant and thereby accommodate disalignment of said telescopic members during their longitudinal telescopic movement.

2. A bearing of the kind referred to comprising an outer tubular member, an inner member telescopic within said outer tubular member, a plurality of axially spaced circumferential rows of anti-friction bearings between said members to permit their free relative longitudinal movement, an auxiliary race member between said anti-friction bearings and said outer tubular member to provide a longitudinal running surface for said anti-friction bearings, and a resilient means between said race member and said outer tubular member to permit said race member to cant and thereby accommodate slight disalignment of said telescopic members during their longitudinal telescopic movement.

3. A bearing as claimed in claim 1, wherein said resilient means, by which the auxiliary race member is mounted, comprises an annular sleeve composed of rubber or like soft elastic material.

4. A bearing as claimed in claim 1, wherein the resilient means comprise a plurality of rings of rubber or like soft elastic material.

5. A bearing as claimed in claim 1, wherein a stop device is provided, separately from the auxiliary race member, to limit the lateral relative movement of the telescopic members and thereby limit the compressive load which is applied to the anti-friction bearings by such relative movement.

6. A bearing as claimed in claim 1, in which the telescopic members comprise a cylinder and plunger, wherein the auxiliary race member is fitted to the cylinder and the anti-friction bearings roll directly against the surface of the plunger.

7. A bearing as claimed in claim 1, wherein said resilient means, by which the auxiliary race member is mounted, comprises an annular sleeve composed of rubber or like soft elastic material and acts as a packing to prevent leakage of fluid between the auxiliary race member and the telescopic member to which it is fitted.

8. A bearing as claimed in claim 1, wherein the resilient means comprises a plurality of rollers which are resilient radially and are interposed between an auxiliary race member and the cylinder to permit the auxiliary race member to rotate within the cylinder.

9. A bearing as claimed in claim 1, wherein the auxiliary race member is provided, intermediate its ends, with a circumferential thickening which bears rockably against the telescopic member to which latter the auxiliary race member is fitted.

10. A bearing as claimed in claim 1, wherein the auxiliary race member is provided, intermediate its ends, with a circumferential thickening which bears rockably against the telescopic member to which latter the auxiliary race member is fitted, the resilient means being localised near the end parts of the auxiliary race member.

11. A telescopic shock absorber comprising a cylinder, an outer casing attached to said cylinder at the open end thereof, a plunger telescopic within said casing and said cylinder, a plurality of axially spaced circumferential rows of anti-friction bearings upon the plunger, an auxiliary race member between said anti-friction bearings and said casing to provide a longitudinal running surface for said anti-friction bearings, and resilient means between said race member and said casing to permit said race member to cant and thereby accommodate disalignment of said telescopic members during their longitudinal telescopic movement.

PETER WARBORN THORNHILL.
JOHN HENRY ONIONS.